H. W. HALES.
WEEDING IMPLEMENT.
APPLICATION FILED JULY 3, 1917.
1,262,482.
Patented Apr. 9, 1918.
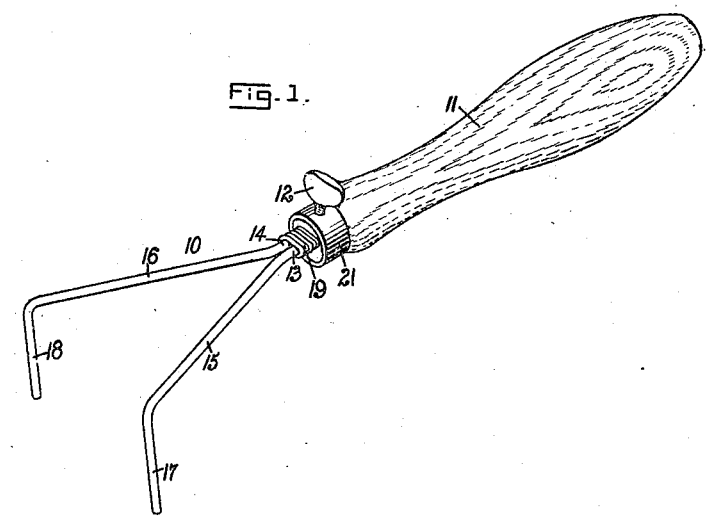
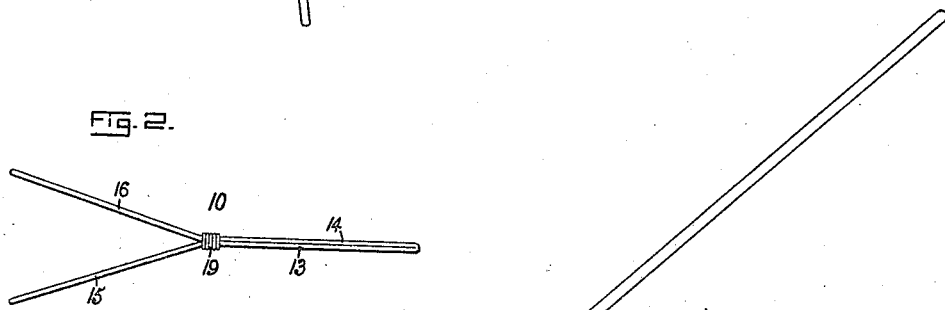
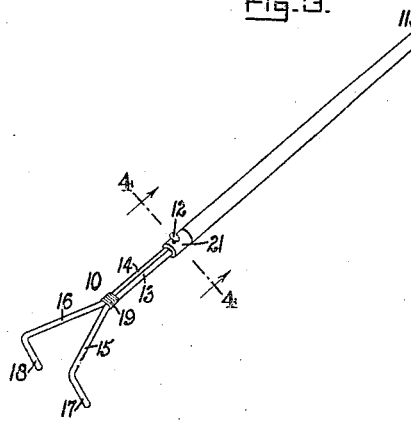
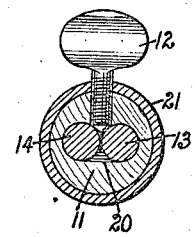
WITNESSES
INVENTOR
H. W. Hales
BY
ATTORNEYS

UNITED STATES PATENT OFFICE.

HENRY W. HALES, OF RIDGEWOOD, NEW JERSEY.

WEEDING IMPLEMENT.

1,262,482.

Specification of Letters Patent.

Patented Apr. 9, 1918.

Application filed July 3, 1917. Serial No. 178,343.

*To all whom it may concern:*

Be it known that I, HENRY W. HALES, a citizen of the United States, and a resident of Ridgewood, in the county of Bergen and State of New Jersey, have invented a new and Improved Weeding Implement, of which the following is a full, clear, and exact description.

The invention relates to hoes and similar agricultural implements, and its object is to provide a new and improved weeding implement which is very simple and durable in construction, cheap to manufacture and arranged for use in the garden or field to effectively dislodge weeds and other undesirable plants.

In order to accomplish the desired result use is made of a handle having a bore, a weeder tool proper made of a single piece of spring wire having a portion doubled up to form a shank of two members arranged side by side, the shank fitting into the said bore and the shank members terminating at their outer ends in integral diverging arms terminating in angular prongs, and fastening means on the handle and engaging said shank to adjustably secure the weeder tool in position in the handle.

A practical embodiment of the invention is represented in the accompanying drawings forming a part of this specification, in which similar characters of reference indicate corresponding parts in all the views.

Figure 1 is a perspective view of the weeding implement provided with a short handle;

Fig. 2 is a plan view of the weeder tool proper;

Fig. 3 is a perspective view of the weeding implement provided with a long handle; and Fig. 4 is an enlarged cross section of the same on the line 4—4 of Fig. 3.

The weeding implement in its general construction comprises a weeder tool proper 10, a handle 11, and fastening means 12 for fastening the weeding tool 10 adjustably in position in the handle 11 to project from one end thereof. The weeder tool 10 is formed of a single piece of spring wire having a portion doubled up to provide two shank members 13 and 14 arranged one alongside the other, the outer ends of the shank members 13 and 14 terminating in diverging arms 15, 16, the outer ends of which terminate in prongs 17 and 18 approximately at right angles to the diverging arms 15 and 16. By the arrangement described the prongs 17 and 18 are spaced apart in parallel relation one relative to the other, as plainly indicated in Figs. 1 and 3.

In order to hold the shank members 13 and 14 one alongside the other, use is made of a collar 19, preferably in the form of a piece of wire wrapped around the two shank members 13 and 14 adjacent the diverging arms 15 and 16. In practice, I have found that about five convolutions of this wrapping wire produce the desired result. The handle 11 is provided with a bore 20 made elongated in cross section, as plainly indicated in Fig. 4, to accommodate the two shank members 13 and 14 thus preventing the weeder tool proper 10 from turning in the handle 11. The shank formed by the shank members 13 and 14 is of a considerable length to permit of adjusting the weeder tool proper 10 lengthwise on the handle 11 with a view to project the prongs 17 and 18 farther from or nearer to the forward end of the handle 11.

The weeder tool 10 after it is moved into the desired position relative to the handle 11 is fastened in place by the fastening means 12 which latter are preferably in the form of a thumb screw screwing in a metallic ferrule 21 held on the forward end of the handle 11. The screw extends through the top portion of the handle 11 and engages with its inner end the two shank members 13 and 14 so as to securely hold the said shank members in position in the handle 11. It will be noticed that when the screw is loosened the shank members 13 and 14 can be readily pushed inward or pulled outward in the bore 20 in order to space the prongs 17 and 18 the desired distance from the end of the handle, and when the desired position has been reached the operator screws up the thumb screw to securely fasten the shank members 13 and 14 in position in the bore 20 of the handle 11.

For garden use the handle 11 is preferably cut short and shaped for convenient holding in one hand, as indicated in Fig. 1, but for field use the handle 11 is preferably like a hoe handle, that is, of considerable length to be grasped by both hands.

When using the weeding implement for garden purposes the shanks 13 and 14 are pushed into the bore 20 to the full extent, that is, until the collar 19 abuts against the outer end of the handle, as indicated in Fig. 1. Thus the collar 19 forms a stop for the weeder tool proper 10 relative to the handle 11.

It is understood for weeding and hoeing purposes the shank members are preferably extended relative to the handle 11, as shown in Fig. 3, so as to give more spring to the projecting portion of the weeder tool 10.

The weeding implement shown and described is composed of comparatively few parts, not liable to get easily out of order, and the parts can be readily assembled and disassembled, and in case one is broken or injured it can be readily replaced by another and placed in position on the remaining parts.

The weeding implement shown in Fig. 1 is particularly useful for loosening the soil in flower pots and similar receptacles. In this case one prong is engaged with the soil in the pot and the other prong is engaged exteriorly with the rim of the pot and the implement is then drawn around the pot or the latter is turned whereby the prong in the soil stirs up and loosens the latter and with it any weeds that may have grown in the pot. A large number of flower pots can be treated in this manner in a comparatively short time. It will be noticed that in using the implement on a flower pot the outside prong forms a guiding member and the other the loosening member.

In order to attain the best results, the weeding tool proper 10 is made adjustable relative to the handle to adapt the tool to the grasp of any individual user thereby rendering the tool equally useful for a person with a large hand or one with a small hand.

When using the implement among or around roses or other thorny plants, the weeding tool proper 10 is drawn out to its full extent to prevent the hand holding the tool from being scratched by the thorns.

By having but two spaced prongs the user can work extremely close to cultivated plants as one prong can be used repeatedly on each side of the plant and run around the same while inserted in the soil to loosen the latter without injury to the roots or the stem of the plant.

By using but two prongs and spacing the same quite a distance apart the implement is not liable to be clogged up with weeds, leaves or rubbish.

Having thus described my invention, I claim as new and desire to secure by Letters Patent:—

1. A weeding implement, comprising a handle having a bore elongated in cross section, a weeder tool proper made of a single piece of spring wire having a portion doubled up to form a shank of two members arranged side by side, the shank slidingly fitting into the said bore and the shank members terminating at their outer ends in integral diverging arms terminating in angular prongs, a collar fitting around the shank members adjacent the said diverging arms and located forward of the said handle, and fastening means on the handle and engaging the said shank to adjustably secure the weeder tool in position in the handle.

2. A weeding implement, comprising a handle having a bore, a weeder tool proper made of a single piece of spring wire having a portion doubled up to form a shank of two members arranged side by side, the shank fitting into the said bore and the shank members terminating at their outer ends in integral diverging arms terminating in angular prongs, a collar formed of a piece of wire wrapped around the shank members adjacent the said diverging arms, and fastening means on the handle and engaging the said shank to adjustably secure the weeder tool in position in the handle.

3. A weeding implement provided with a weeding tool proper formed of a single piece of spring wire having a portion doubled up to provide a shank formed of two members arranged side by side, diverging arms extending integrally from the ends of the doubled-up shank members, prongs extending integrally approximately at a right angle from the outer ends of the said arms, and a collar formed of a piece of wire wrapped around the said shank members adjacent the said diverging arms.

4. A weeding implement, comprising a handle having a bore, a weeder tool proper made of a single piece of spring wire having a portion doubled up to form a shank of two members arranged side by side, the shank fitting into the said bore and the shank members terminating at their outer ends in integral diverging arms terminating in angular prongs, a collar formed of a piece of wire wrapped around the said shank members adjacent the said diverging arms, a ferrule on the said bore portion of the handle, and a set screw screwing in the said ferrule and against the shank members.

HENRY W. HALES.

Copies of this patent may be obtained for five cents each, by addressing the "Commissioner of Patents, Washington, D. C."